H. A. WORCESTER.
MULTIPLE SECTION DUMP BODY.
APPLICATION FILED DEC. 2, 1919.
1,428,930.
Patented Sept. 12, 1922.
2 SHEETS—SHEET 1.
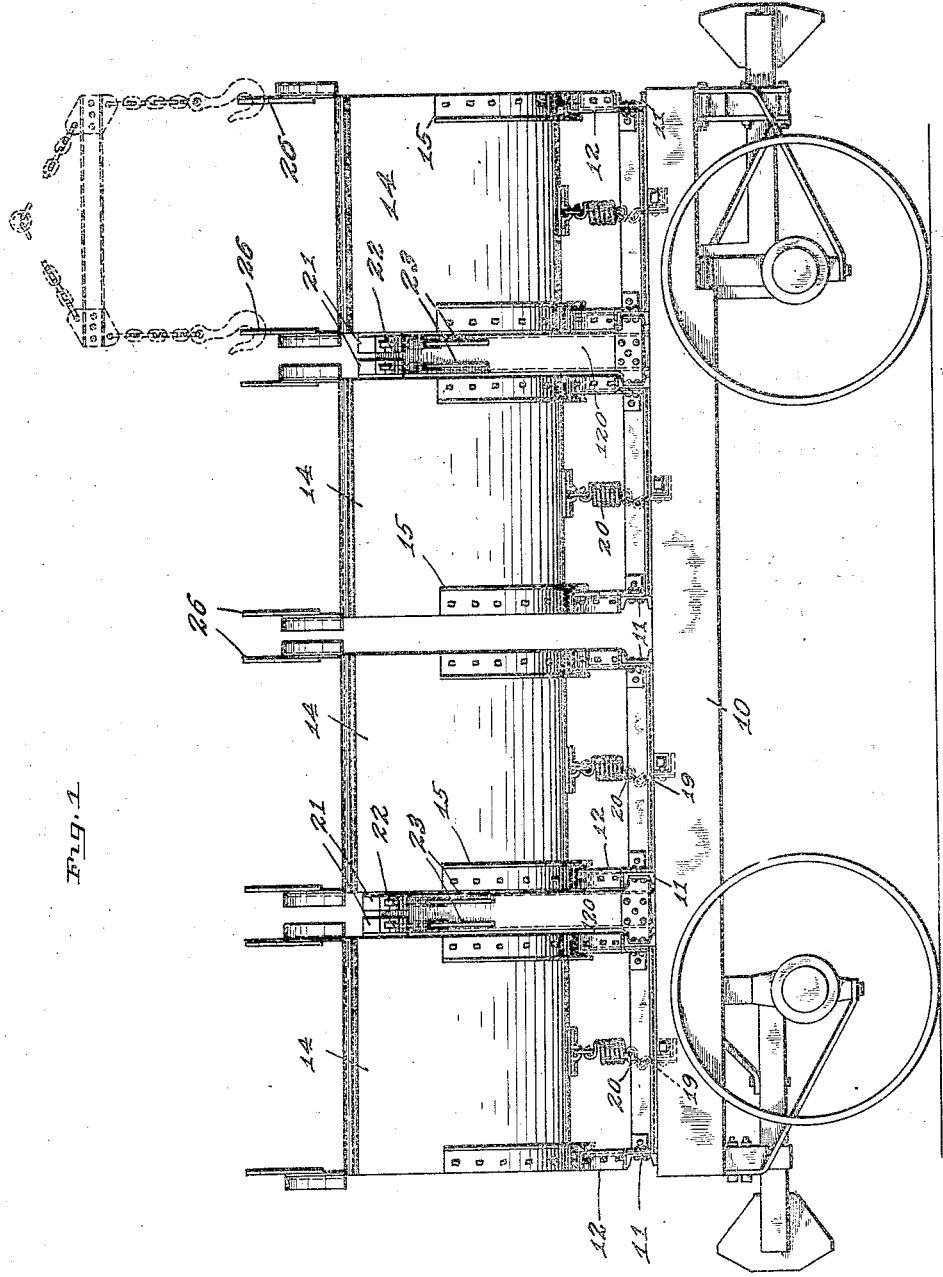
Witness
Inventor
HAROLD A. WORCESTER
By
Hood & Schley
Attorneys

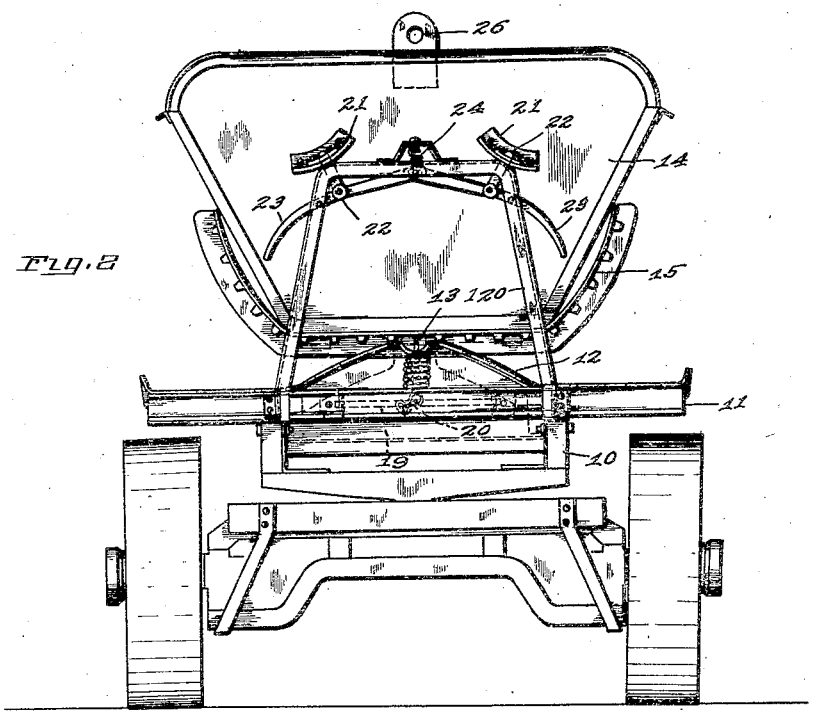

Patented Sept. 12, 1922.

1,428,930

UNITED STATES PATENT OFFICE.

HAROLD A. WORCESTER, OF TROY, OHIO, ASSIGNOR TO INSLEY MANUFACTURING COMPANY, OF INDIANAPOLIS, INDIANA, A CORPORATION OF INDIANA.

MULTIPLE-SECTION DUMP BODY.

Application filed December 2, 1919. Serial No. 341,966.

*To all whom it may concern:*

Be it known that I, HAROLD A. WORCESTER, a citizen of the United States, residing at Troy, in the county of Miami and State of Ohio, have invented a new and useful Multiple-Section Dump Body, of which the following is a specification.

The object of my invention is to produce a dump-body vehicle comprising a plurality of independently removable and independently dumpable interchangeable bodies or containers, and a vehicle body provided with a plurality of seats upon which any one of the dump-bodies may be placed for transportation and rolling dumping action.

The accompanying drawings illustrate an embodiment of my invention. Fig. 1 is a side-elevation, with a convenient removing means indicated in dotted lines, and Fig. 2 an end elevation.

In the drawings, 10 indicates a vehicle frame of desired type provided with a plurality of pairs of transverse tracks 11, 11, each of which (in the form shown) is formed with an intermediate hump 12 and a middle socket 13. Each dump body 14 preferably has upwardly and outwardly flaring sides (see Fig. 2) and is provided with a pair of rocker-rails 15, 15 so formed as to cooperate with tracks 11, 11 to permit a proper and desired rolling dumping action of the bodies 14. The form of track and rail may be considerably varied.

In order to limit the outward roll of each body 14, I provide beneath it a transverse traveller rod 19 upon which is slidably mounted one end of a connector 20 preferably embodying a spring, and the upper end of this connector is attached to the body 14 at the middle of its bottom. In order that the bodies 14 may be removable and that only a minimum number of connectors be required, I prefer to make the connectors readily detachable from bodies 14. The bodies 14 must be retained normally in load-carrying position both against rolling and against vertical and lateral displacement on the tracks. This I accomplish by a simple means. Adjacent each body 14 is a brace or standard 120 the upper corners of which are engaged by shoes 21, 21 carried by body 14. Projecting through the corners of standard 20 and into adjacent shoes 21 are two outwardly and upwardly moving bolts 22, 22, the inner end of each of which is pivoted to an operating lever 23. The outer ends of levers 23 are projected through holes in standard 20 and their inner ends are connected together by loose joint. A spring 24 serves to normally hold up the inner ends of levers 23 and to project bolts 22.

By this arrangement, bolts 22, when interlocked with shoes 21, to simultaneously prevent either rolling or jumping movement of body 14. An upward pull upon the outer end of either lever 23 will simultaneously retract both bolts.

Each body 14 may be provided with eyes 26 by which it may be easily lifted to and from place on tracks 11.

I claim as my invention:

1. In a dump-body vehicle, the combination with the vehicle frame, and a rolling dump body, of a pair of lock-bolts arranged to act along lines inclined both to the vertical and horizontal, and means coacting with said bolts to connect the rolling body with the main frame to resist both vertical and rolling displacement of the rolling body upon the main frame.

2. In a dump-body vehicle, the combination with the vehicle frame, and a rolling dump body, of a pair of lock-bolts arranged to act along lines inclined both to the vertical and horizontal, means coacting with said bolts to connect the rolling body with the main frame to resist both vertical and rolling displacement of the rolling body upon the main frame, and operating means by which said bolts may be simultaneously rendered ineffective.

3. In a dump-body vehicle, the combination with the vehicle frame and a rolling dump body, of a pair of lock-bolts arranged to act along lines inclined both to the vertical and horizontal, a support for said bolts carried by the main frame, shoes carried by the rolling body and co-acting with said support and bolts, whereby said bolts when active, will resist both vertical and rolling displacement of the rolling body upon the main frame, and a pair of operating means connected to each other and each connected to one of the bolts, substantially as described.

4. In a dump-body vehicle, the combination with the vehicle frame, and a rolling dump body, of a pair of lock-bolts arranged to act along lines inclined both to the vertical and horizontal, a support for said bolts carried by the main frame, and shoes carried by the rolling body and co-acting with said support and bolts, whereby said bolts, when active, will resist both vertical and rolling displacement of the rolling body upon the main frame.

In witness whereof, I have hereunto set my hand at Indianapolis, Indiana, this twenty-eighth day of November, A. D. one thousand nine and nineteen.

HAROLD A. WORCESTER.